United States Patent
Harrison et al.

(10) Patent No.: US 11,355,747 B2
(45) Date of Patent: Jun. 7, 2022

(54) NANOPOROUS CARBON AS HOST MATERIAL FOR SODIUM

(71) Applicant: National Technology & Engineering Solutions of Sandia, LLC, Albuquerque, NM (US)

(72) Inventors: Katharine Lee Harrison, Albuquerque, NM (US); Michael Siegal, Albuquerque, NM (US); Matthaeus Wolak, Albuquerque, NM (US); Paul Cuillier, Columbus, OH (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 167 days.

(21) Appl. No.: 16/737,104

(22) Filed: Jan. 8, 2020

(65) Prior Publication Data

US 2020/0220166 A1    Jul. 9, 2020

Related U.S. Application Data

(60) Provisional application No. 62/789,901, filed on Jan. 8, 2019.

(51) Int. Cl.
| | |
|---|---|
| *H01M 4/36* | (2006.01) |
| *H01M 4/587* | (2010.01) |
| *H01M 4/62* | (2006.01) |
| *H01G 11/32* | (2013.01) |
| *H01G 11/24* | (2013.01) |
| *H01M 10/054* | (2010.01) |
| *H01M 4/02* | (2006.01) |

(52) U.S. Cl.
CPC .......... *H01M 4/366* (2013.01); *H01G 11/24* (2013.01); *H01G 11/32* (2013.01); *H01M 4/587* (2013.01); *H01M 4/628* (2013.01); *H01M 10/054* (2013.01); *H01M 2004/021* (2013.01); *H01M 2004/027* (2013.01)

(58) Field of Classification Search
None
See application file for complete search history.

(56) References Cited

FOREIGN PATENT DOCUMENTS

KR    20170122134 A  *  11/2017

OTHER PUBLICATIONS

Limmer et al., Nanoporous Carbon for Electrochemical Capacitors, 2010, ECT transactions, 28, 89-95 (Year: 2010).*
Zou et al., Evaluating the Storage Behavior of Superior Low-Cost Anode Material from Biomass for High-Rate Sodium-Ion Batteries, May 2017, J Electrochem. Soc., 164, A1431 (Year: 2017).*
Stevens et al., The Mechanisms of Lithium and Sodium Insertion in Carbon Materials, Jun. 2001, J Electrochem. Soc, 148, A803 (Year: 2001).*
Slater, M. D. et al., "Sodium-Ion Batteries", Advanced Functional Materials, 2013, pp. 947-958, vol. 23.
Yabuuchi, N. et al., "Research Development on Sodium-Ion Batteries", Chemical Reviews, 2014, p. 11636-11682, vol. 114.

(Continued)

*Primary Examiner* — Daniel S Gatewood
(74) *Attorney, Agent, or Firm* — Kevin W. Bieg

(57) ABSTRACT

Nanoporous carbon can provide a binderless, three-dimensional form of graphene as a host material for sodium-ion batteries or supercapacitors.

5 Claims, 8 Drawing Sheets

(56) References Cited

OTHER PUBLICATIONS

Stevens, D. A. and Dahn, J. R., "The Mechanisms of Lithium and Sodium Insertion in Carbon Materials", Journal of the Electrochemical Society, 2001, pp. A803-A811, vol. 148.

Liu, P. et al., "A Waste Biomass Derived Hard Carbon as a High-Performance Anode Material for Sodium-Ion Batteries", Journal of Materials Chemistry A, 2016, pp. 13046-13052, vol. 4.

Zou, G. et al., "Evaluating the Storage Behavior of Superior Low-Cost Anode Material from Biomass for High-Rate Sodium-Ion Batteries", Journal of the Electrochemical Society, 2017, pp. A1431-A1437, vol. 164.

Siegal, M. P. et al., "Nanoporous Carbon Films for Gas Microsensors", Langmuir, 2004, pp. 1194-1198, vol. 20.

Siegal, M. P. et al., "Nanoporous-Carbon Films for Microsensor Preconcentrators", Applied Physics Letters, 2002, pp. 3940-3942, vol. 80.

Limmer, S. J. et al., "Nanoporous Carbon for Electrochemical Capacitors", ECT Transactions, 2010, pp. 89-95, vol. 28.

Siegal, M. P. et al., "Nanoporous-Carbon as a Potential Host Material for Reversible Mg Ion Intercalation", Journal of the Electrochemical Society, 2016, pp. A1030-A1035, vol. 163.

Simon, P. and Gogotsi, Y., "Capacitive Energy Storage in Nanostructured Carbon-Electrolyte Systems", Accounts of Chemical Research, 2013, pp. 1094-1103, vol. 46.

Wang, G. et al., "A Review of Electrode Materials for Electrochemical Supercapacitors", Chemical Society Review, 2012, pp. 797-828, vol. 41.

Yu, Z. et al., "Supercapacitor Electrode Materials: Nanostructures from 0 to 3 Dimensions", Energy & Environmental Science, 2015, pp. 702-730, vol. 8.

Cao, Y. et al., "Atomic Layer Deposition of LixAlyS Solid-State Electrolytes for Stabilizing Lithium-Metal Anodes", ChemElectroChem Communications, 2016, pp. 858-863, vol. 3.

Dudney, N. J., "Addition of a Thin-Film Inorganic Solid Electrolyte (Lipon) as a Protective Film in Lithium Batteries with a Liquid Electrolyte", Journal of Power Sources, 2000, pp. 176-179, vol. 89.

Cheng, H-M. et al., "Enhanced Cycleabity in Lithium Ion Batteries: Resulting from Atomic Layer Deposition of Al2O3 ar TiO2 on LiCoO2 Electrodes", The Journal of Physical Chemistry, 2012, pp. 7629-7637, vol. 116.

Manthiram, A. et al., "Lithium Battery Chemistries Enabled by Solid-State Electrolytes", Nature Reviews Materials, 2017, pp. 1-15, vol. 1, Article 16103.

Wu, Z-S. et al., "Graphene/Metal Oxide Composite Electrode Materials for Energy Storage", Nano Energy, 2012, pp. 107-131, vol. 1.

Siegal, M. P., "Detecting Trihalomethanes Using Nanoporous-Carbon Coated Surface-Acoustic-Wave Sensors", Journal of The Electrochemical Society, 2015, pp. B114-B120, vol. 162.

* cited by examiner

NANOPOROUS CARBON AS HOST MATERIAL FOR SODIUM

CROSS-REFERENCE TO RELATED APPLICATION

This application claims the benefit of U.S. Provisional Application No. 62/789,901, filed Jan. 8, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to electrochemical energy storage systems and, in particular, to nanoporous carbon as a host material for sodium-ion battery or supercapacitor electrodes.

BACKGROUND OF THE INVENTION

Developing electrochemical (EC) energy storage systems (i.e. batteries, supercapacitors) with increased energy/power densities is critically important for commercial and military applications. These include portable electronics, electrification of vehicles, and high energy storage capacity for the grid as the nation moves to renewable energy sources with discontinuous energy production, such as wind and solar.

Lithium-ion energy storage is the current state of the art in rechargeable batteries. Lithium is the lightest metal and has the lowest standard potential, compared to other candidate metals (Na, Mg, Al, K, Ca, etc.). These factors allow high energy density. Lithium metal would be an ideal anode material because it has a high theoretical specific energy capacity of 3861 mAh/g and a volumetric capacity of 2061 mAh/cm$^3$. However, lithium metal has several problems that inhibit its use in electrochemical storage systems, including the formation of a solid electrolyte interphase (SEI), uncontrolled morphology issues (e.g., dendrite formation, which can cause short circuiting), and low coulombic efficiency. Alloys with lithium also can exhibit high charge storage capacities and morphology is more well controlled, but alloys can suffer large irreversible capacity losses due to stress-induced cracking.

Therefore, state-of-the-art (SOA) lithium batteries are based on Li-ion intercalation into carbon anode materials. Carbon has the combined advantages of low cost, abundant availability, low delithiation potential, high electrical conductivity, and relatively low volume change during lithiation/delithiation. In particular, lithium-intercalated graphite is the SOA anode material used in Li-ion batteries today and has allowed Li-ion batteries to become ubiquitous in many applications. See S. Goriparti et al., *J. Power Sources* 257, 421 (2014). When lithium intercalates into graphitic carbon, it forms a LiC$_6$ crystalline phase that has a theoretical specific energy capacity of 372 mAh/g and a volumetric capacity of 841 mAh/cm$^3$. Graphite has been optimized in SOA batteries such that its practical capacity (~300-330 mAh/g) is close to the limits of its theoretical capacity. See J. Jiang et al., *Energy Environ. Sci.* 7, 2670 (2014). Importantly, the volumetric expansion due to the lithiation of graphite is typically less than 10%. See Y. Qi and S. J. Harris, *J. Electrochem. Soc.* 157(6), A741 (2010). This low volumetric change enables the graphitic carbon anode to survive thousands of charge/discharge cycles before degradation. However, graphite has a small, 3.35 Angstroms, interplanar spacing that allows only one layer of Li ions between the sheets. Graphitic carbon electrodes are typically constructed from powder graphite particles mixed with a conductive carbon filler and a binder to generate a conductive, porous electrode. The pores allow intimate contact with the electrolyte throughout the thickness of the porous electrode. However, these additives also further reduce the total charge capacity available using graphite electrodes.

Graphene may be an attractive alternative for reversible lithium storage in Li-ion batteries, due to its large surface-to-volume ratio and high conductivity. Graphene is a two-dimensional crystal of carbon, essentially a single layer cut out of the graphite structure. However, graphene sheets have to be assembled into a bulk electrode and that process leads to a disordered carbon architecture. The mechanisms for incorporation of lithium into graphene and other disordered carbon electrodes are still under debate and likely depend on the structure, density, and chemical composition of the assembled graphene electrode. The potential mechanisms include lithium intercalation, adsorption of lithium on both sides of the sheets, lithium adsorption with functional groups at defects and edges of the sheets, and lithium plating or adsorption in open pores between sheet stacks. However, graphene also has been found to have low coulombic efficiency and experiences capacity fade. Additionally, graphene lithiates over a wide range of voltages which would result in a varying cell voltage when paired with a cathode in a full cell. Thus, it is likely that only a portion of the capacity could be used in a real system to minimize the voltage variation with state of charge.

Sodium-ion batteries are an alternative technology which has several advantages and disadvantages. Lithium availability and cost have been projected to be problematic, especially if lithium-ion batteries were used in widespread electric vehicle and/or grid storage applications. Sodium, conversely, is abundant and inexpensive compared to lithium so there is great interest in commercializing sodium-ion batteries for some applications where large amounts of sodium would be required. See M. Slater et al., *Adv. Funct. Mater.* 23, 947 (2019); and N. Yabuuchi et al., *Chem. Rev.* 114, 11636 (2014). Sodium also suffers from disadvantages compared to lithium. Sodium has a higher standard potential and is heavier than lithium; both of these attributes lead to lower energy density than lithium-ion batteries. Furthermore, sodium ions are too large to intercalate between graphite sheets like lithium ions do. Consequently, graphite anodes in Na-ion batteries only demonstrate specific capacities of about 30 mAh/g, far below the theoretical 372 mAh/g capacity of NaC$_6$ intercalation compounds. See D. A. Stevens and J. R. Dahn, *J. Electrochem. Soc.* 148, 803 (2001). Thus, graphite cannot be used as an anode for Na-ion batteries. Therefore, there is interest in alternative types of carbon for use as sodium anodes. Several different types of carbons have been proposed. See, for example, P. Liu et al., *J. Mater. Chem. A.* 4, 13046 (2016); and Zou et al., *J. Electrochem. Soc.* 164 (7), A1431 (2017).

SUMMARY OF THE INVENTION

Nanoporous carbon (NPC) has been developed as an electrode material for Na-ion batteries and supercapacitors. Galvanostatic cycling experiments in coin cell batteries have demonstrated that NPC behaves like a three-dimensional graphene anode. The interplanar spacing between sheets in the NPC can be controlled and the spacing greatly affects the charge storage capacity. Typical capacities presented in the literature after tens of cycles are on the order of 100-350 mAh/g; NPC can achieve similar capacity and also provides the ability to systematically tune carbon sheet spacing and density to optimize performance. As is typical with graphene, capacity fades relative to initial cycles for most samples. Protective coatings, solid electrolytes, and co-deposition of nanoparticles can minimize the capacity fade. NPC is synthesized through pulsed laser deposition (PLD). Therefore, it is of particular interest for application in thin film batteries, such as coin cells, because their fabrication is compatible with thin film deposition techniques, such as PLD. These films can also be used as artificial electrolyte interfaces or scaffolds for sodium plating.

BRIEF DESCRIPTION OF THE DRAWINGS

The detailed description will refer to the following drawings, wherein like elements are referred to by like numbers.

DETAILED DESCRIPTION OF THE INVENTION

Figure 1:
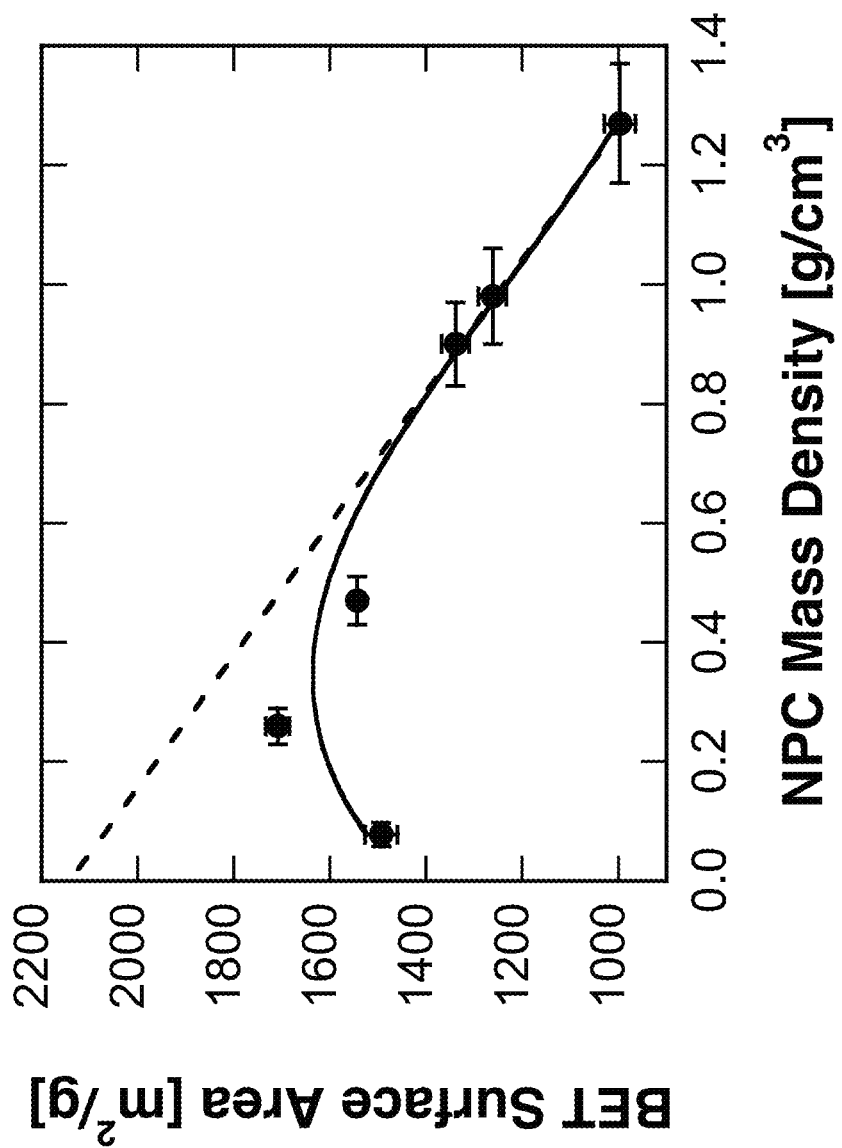
FIG. 1 is a graph of the NPC surface area calculated from BET isotherms as a function of NPC mass density.

NPC is a unique and attractive carbon material for sodium-ion storage. NPC materials can be grown with controlled mass density and total surface area. The total surface area for a given mass of material defines the fraction of material that is available for sodium ion adsorption. The Brunauer-Emmett-Teller (BET) method can be used to measure surface areas. See S. Brunauer et al., *J. Am. Chem. Soc.* 60, 309 (1938). FIG. 1 shows how surface area varies with NPC mass density. The solid line is merely a guide-for-the-eye. Surface area increases with decreasing mass density for all but the lowest mass density materials studied, ranging from 997±32 m$^2$/g to 1,709±24 m$^2$/g for samples with mass densities ranging from 1.27-0.26 g/cm$^3$, respectively. Overall, such values are mostly higher than those reported for other carbon materials. For example, while the surface area of a single graphene sheet is 2,630 m$^2$/g, chemically-modified graphene agglomerates used for graphene-based supercapacitors report BET surface area of only 705 m$^2$/g. See M. D. Stoller et al., *Nano Lett.* 8, 3498 (2008). Ordered mesoporous carbons have 1,500-1,800 m$^2$/g surface areas, similar to the NPC results, however, such materials typically have extremely low mass densities<0.1 g/cm$^3$ due to the nature of their porosity, rendering them to be very soft mechanical structures. See R. Ryoo et al., *Adv. Mater.* 13, 677 (2001). Carbon nanotube bundles have BET surface areas ranging from 200-600 m$^2$/g depending on tube diameters and other structure characteristics. See F. Li et al., *Carbon* 42, 2375 (2004). So, while both graphene and nanotubes have very high individual surface areas, in agglomerates and bundles most of the measurable surface area is diminished. NPC is electrically conductive and mechanically continuous; hence it does not require the use of binder materials to hold to particles together or conductive additives. Eliminating the need for a binder alone can provide a small, but important enhancement to Na-ion energy capacity for a thin-film electrode configuration.

Figures 2A, 2B, 2C:
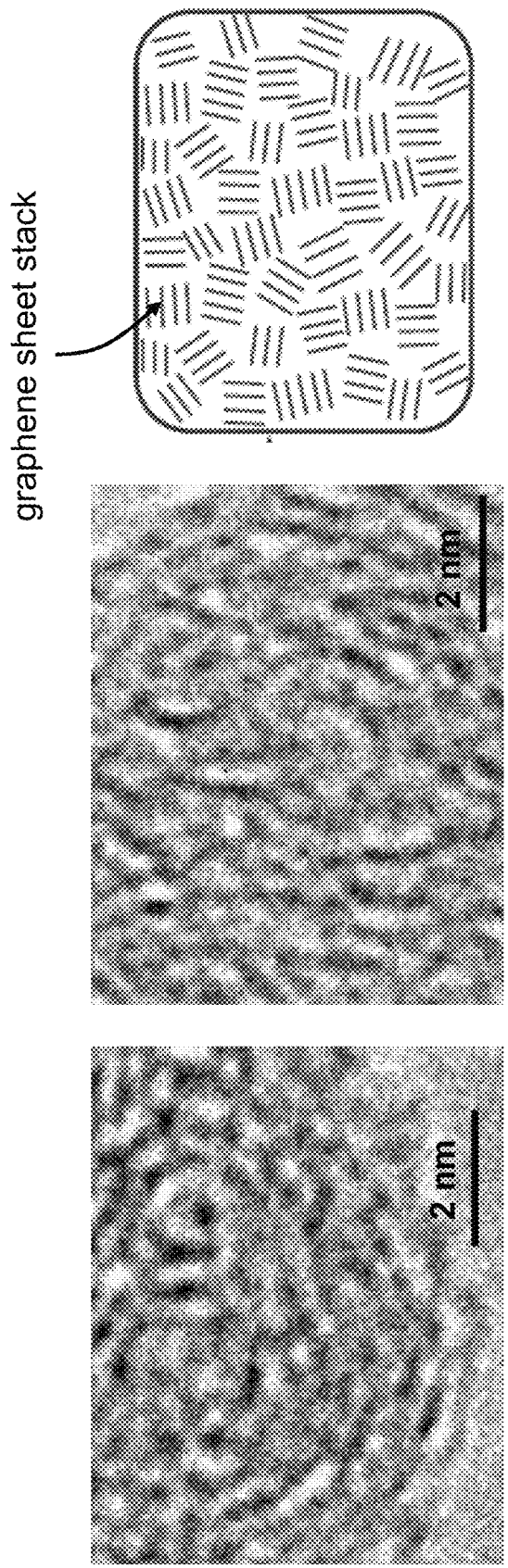
FIG. 2A is a TEM image of NPC material with a density 1.0 g/cm$^3$.
FIG. 2B is a TEM image of NPC material with a density 0.25 g/cm$^3$.
FIG. 2C is a schematic illustration showing the nanocrystalline domain structure of NPC.

NPC is able to achieve such high surface areas for relatively high mass densities due to the unique nature of its microstructure. The internal structure of NPC consists of nanofragments of randomly oriented graphene sheet stacks ("3D graphene") that have interplanar spacings expanded by as much as 55% compared to crystalline graphite. Shown in FIG. 2A is a high-resolution transmission electron microscopy (TEM) image of NPC material with a density 1.0 g/cm$^3$, having an interplanar spacing of about 4.4-4.8 Å. It has been shown that an interplanar spacing exceeding 3.7 Å is needed for successful Na$^+$ insertion, so the spacing in NPC should be sufficient. See Y. Cao et al., *Nano Letters* 12, 3783 (2012). FIG. 2B shows a TEM image of NPC material with a density 0.25 g/cm$^3$, having an interplanar spacing of about 5.1-5.4 Å. Several occurrences of nanofragments exist in both images. Typical crystalline domain sizes are only 1-2 nm in length. In contrast, the interplanar spacing of crystalline graphite is only 3.35 Å. Hence, NPC consists of randomly-oriented nanodomains of stacked graphene sheets with expanded interplanar spacings, creating pores and a plethora of grain boundaries to enable rapid diffusion of species into the entire volume. This is illustrated schematically in FIG. 2C. Reducing the mass density of NPC increases the interplanar spacing, creating enhanced diffusion channels to enable intercalations of various ionic species. See M. P. Siegal et al., *Langmuir* 20, 1194 (2002).

NPC can be synthesized through pulsed laser deposition (PLD) by ablating a rotating pyrolytic graphite target with a 248-nm ultraviolet pulsed excimer laser in a controlled argon atmosphere. See M. Siegal et al., *Appl. Phys. Lett.* 80, 3940 (2002); M. Siegal and W. Yelton, *Nanoporous-Carbon Coatings for Gas-Phase Chemical Microsensors*, Advances in Science and Technology, Trans Tech Publ: 2006; pp 161-168; M. P. Siegal et al., *J. Electrochem. Soc.* 162, B114 (2015); S. J. Limmer et al., *ECS Trans.* 28, 89 (2010); and M. P. Siegal et al., *J. Electrochem. Soc.* 163, A1030 (2016), which are incorporated herein by reference. The interplanar spacing of NPC and the NPC film density is controlled by the argon gas pressure, laser energy, and target-substrate distance used during growth. As described above, the internal structure of NPC self-assembles during growth and consists of nano-fragments of aligned graphene sheet assemblies that stack randomly to provide a plethora of grain boundaries for rapid diffusion. As deposited, NPC is a pure sp$^2$-bonded carbon material with negligible residual stress, enabling the growth of multi-µm thick films.

Figure 3A:
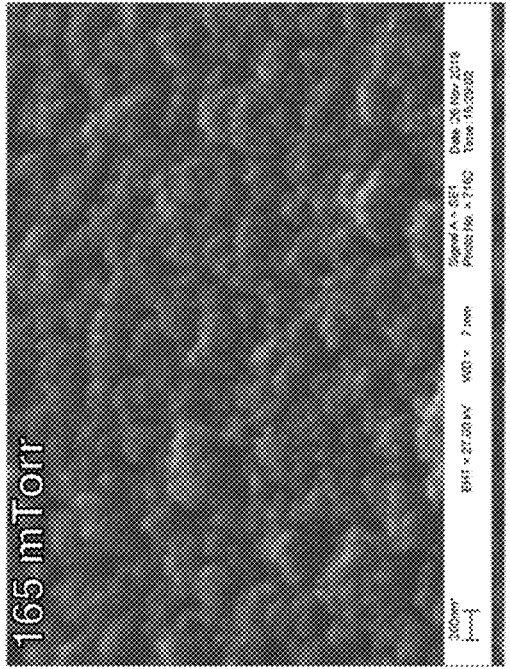
FIGS. 3A-3D are scanning electron microscope images that show the NPC surface morphology as a function of argon pressure.
Figure 3B:
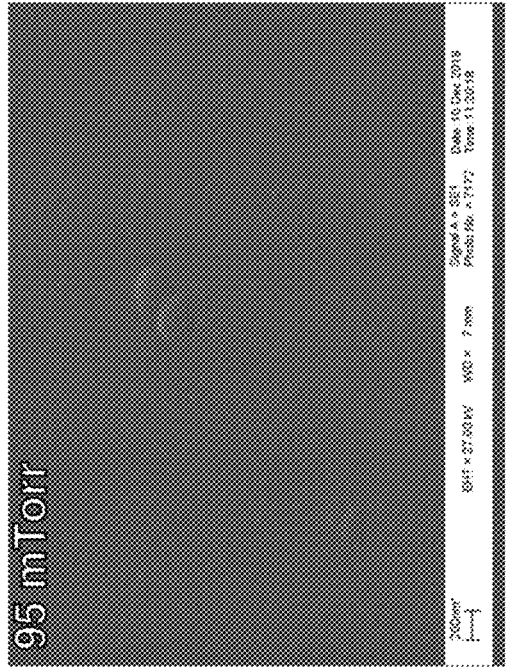

FIGS. 3A-3D are scanning electron microscope (SEM) images that show the NPC surface morphology as a function of argon pressure. All of the deposited films had a carbon areal mass density of about 0.1 mg/cm$^2$. FIG. 3A is an SEM of a NPC film having a density of 0.4 g/cm$^3$ deposited at 185 mTorr Ar pressure. FIG. 3B is an SEM of a NPC film having a density of deposited 0.8 g/cm$^3$ at 165 mTorr Ar pressure.

Figure 3C:
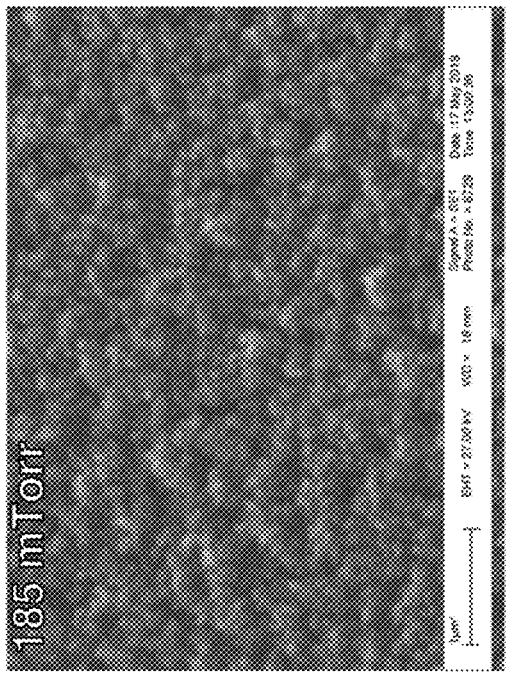
Figure 3D:
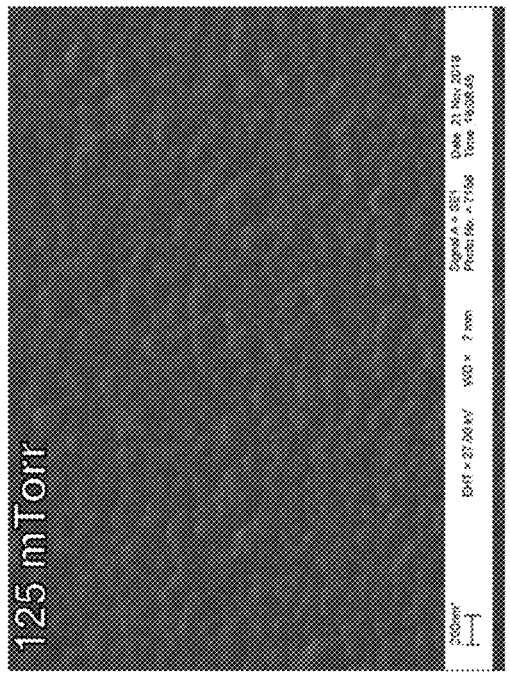
Figure 4:
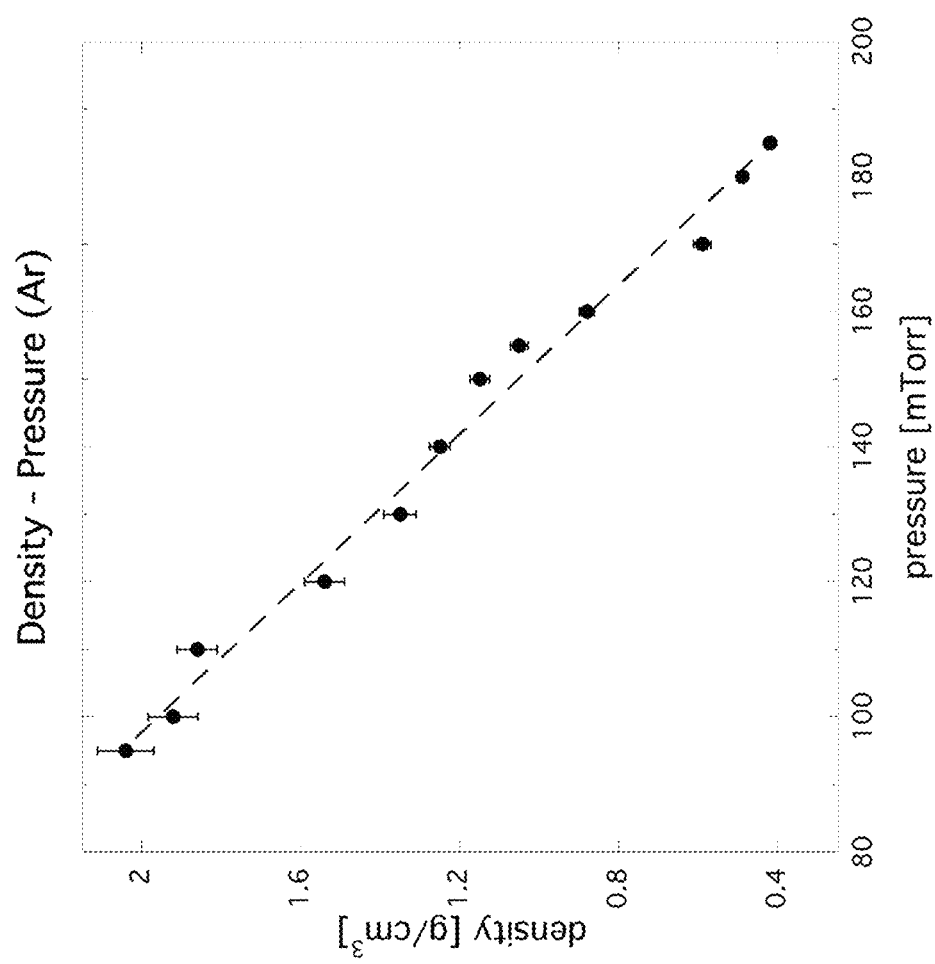
FIG. 4 is a graph of the NPC mass density as a function of Ar deposition pressure.

FIG. 3C is an SEM of a NPC film having a density of 1.5 g/cm$^3$ deposited at 125 mTorr Ar pressure. FIG. 3D is an SEM of a NPC film having a density of 2.0 g/cm$^3$ deposited at 95 mTorr Ar pressure. FIG. 4 is a graph of the NPC mass density as a function of Ar deposition pressure.

Figure 5:
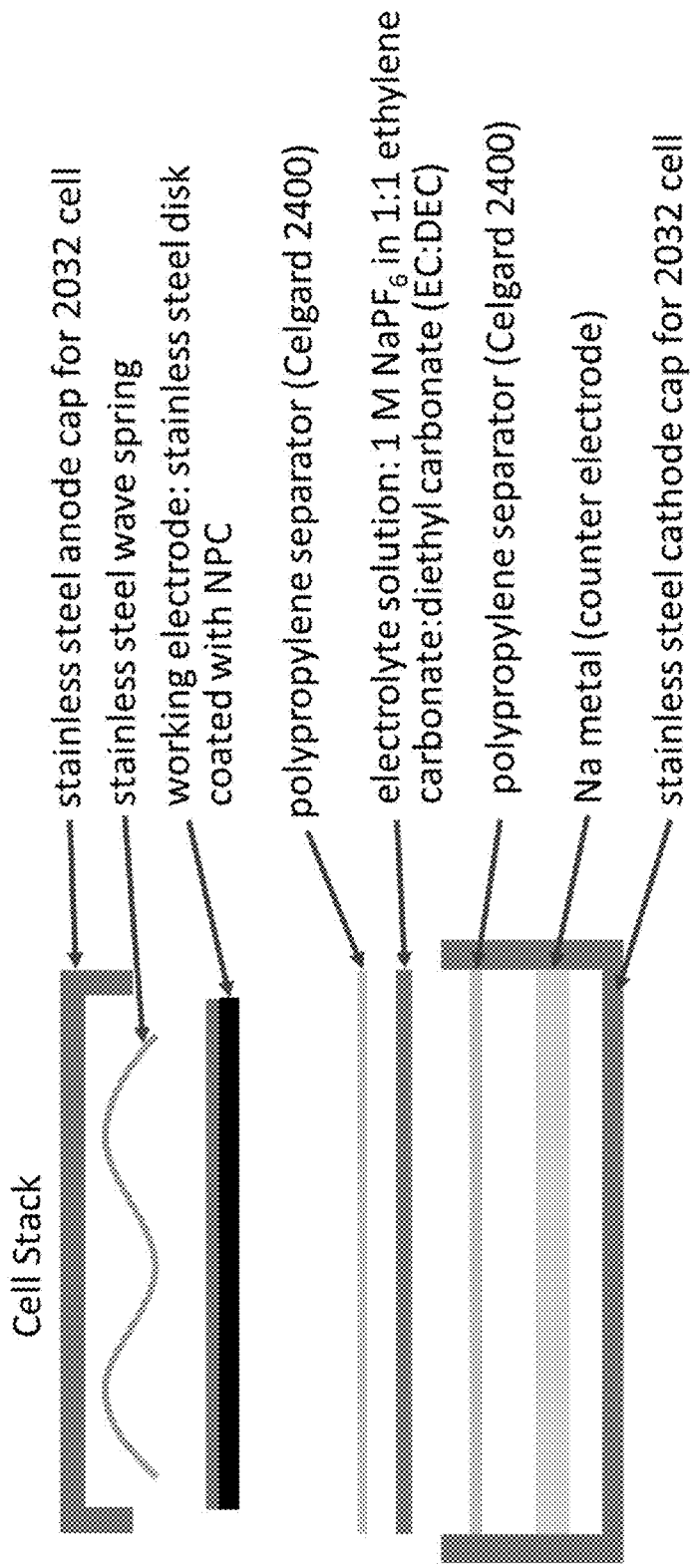
FIG. 5 is a schematic illustration of a coin cell battery assembly.

Electrochemical testing was performed for NPC films of varying volumetric mass density. NPC films were deposited onto stainless steel discs and assembled in coin cell batteries for electrochemical evaluation, as shown in FIG. 5. All NPC films were dried and outgassed for over 48 hours prior to assembly into coin cells in a Ar-purged glove box. 1 M NaPF$_6$ in 1:1 ethylene carbonate:diethyl carbonate (EC: DEC) was used as the electrolyte solution. Sodium metal was used as the counter electrode. The NPC films tested had mass densities of 0.6 g/cm$^3$, 1.0 g/cm$^3$, and 2.0 g/cm$^3$. Because all films were deposited with areal densities of about 0.1 mg/cm$^2$, the thicknesses varied accordingly to achieve the mass densities in FIG. 4.

Figures 6A, 6B:
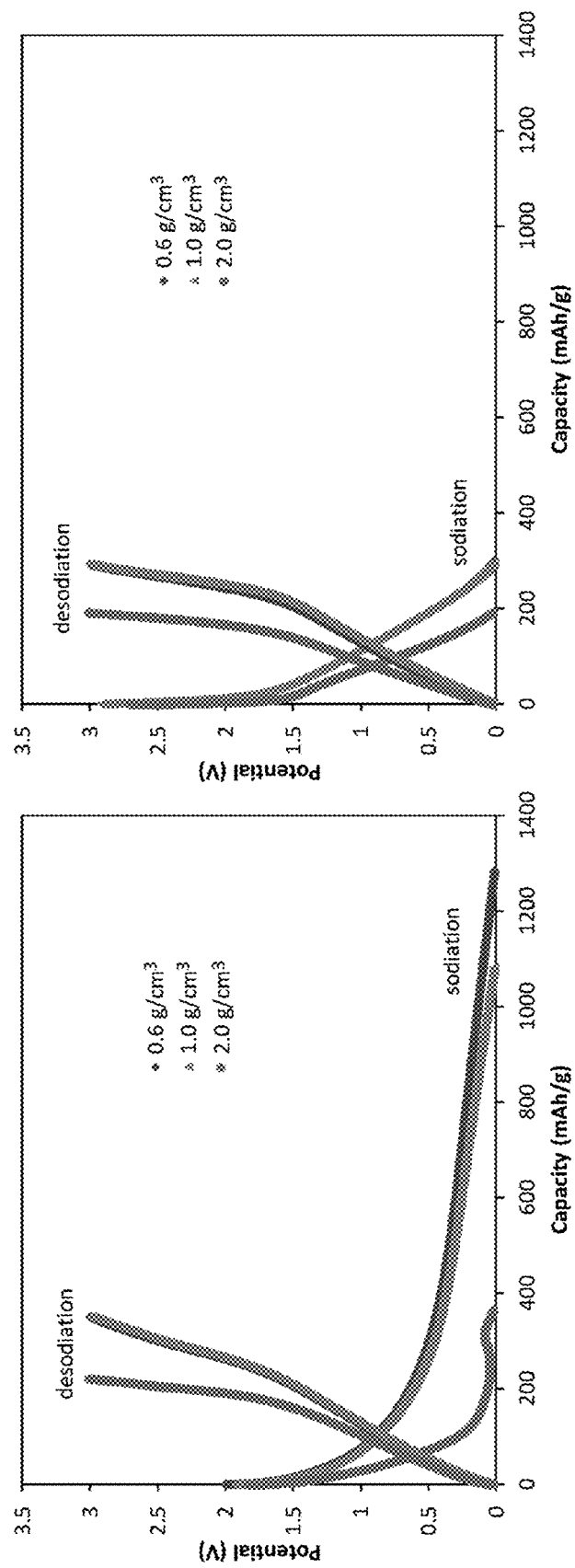
FIGS. 6A and 6B are graphs of the galvanostatic charge-discharge curves for NPC coin cell batteries for the 1$^{st}$ and 90$^{th}$ cycle, respectively.

Sodiation of NPC was investigated through galvanostatic coin cell cycling. FIGS. 6A and 6B are graphs of the galvanostatic charge-discharge curves for NPC coin cells versus Na metal counter electrodes for the 1st and 90th cycles, respectively. These graphs indicate that Na can be successfully stored in NPC. The sodiation capacity increases with decreasing NPC density. The low NPC density samples show a sloping capacity and then a plateau at low voltage associated with significant capacity during the first sodiation. The first desodiation results in a lower capacity than the first sodiation. For example, the 0.6 g/cm$^3$ NPC anode delivered a specific capacity of ~1300 mAh/g in the initial sodium insertion and a capacity of about ~350 mAh/g in the first sodium removal. The irreversible portion of the capacity may indicate the formation of an SEI layer in the first cycle, sodium being trapped in pores, or sodium irreversibly reacting with edge groups on the graphene sheets. Further, it is apparent that NPC behaves like graphene-like materials with sloping sodiation and desodiation curves. See J. Wan. et al., *Chem. Mater.* 28, 6528 (2016). This observation is in correlation to the expanded interplanar spacing and higher degree of disorder in sheet assembly of NPC as compared to a material like graphite that exhibits negligible capacity for sodiation. There are significant differences between the first cycle charge-discharge profiles for various NPC densities. The 2.0 g/cm$^3$ NPC sample exhibits a feature near the end of the first sodiation where the potential increases then decreases again near the cutoff of 0.01 V. NPC grown at 2.0 g/cm$^3$ consistently shows this feature only on the first cycle and the other densities do not. The origin of this feature remains unclear, but it may be a nucleation overpotential related to sodium plating at this low potential. As shown in FIG. 6B, the irreversibility between sodiation and desodiation as well as the capacity fade is minimized in later cycles for all densities.

Figure 7:
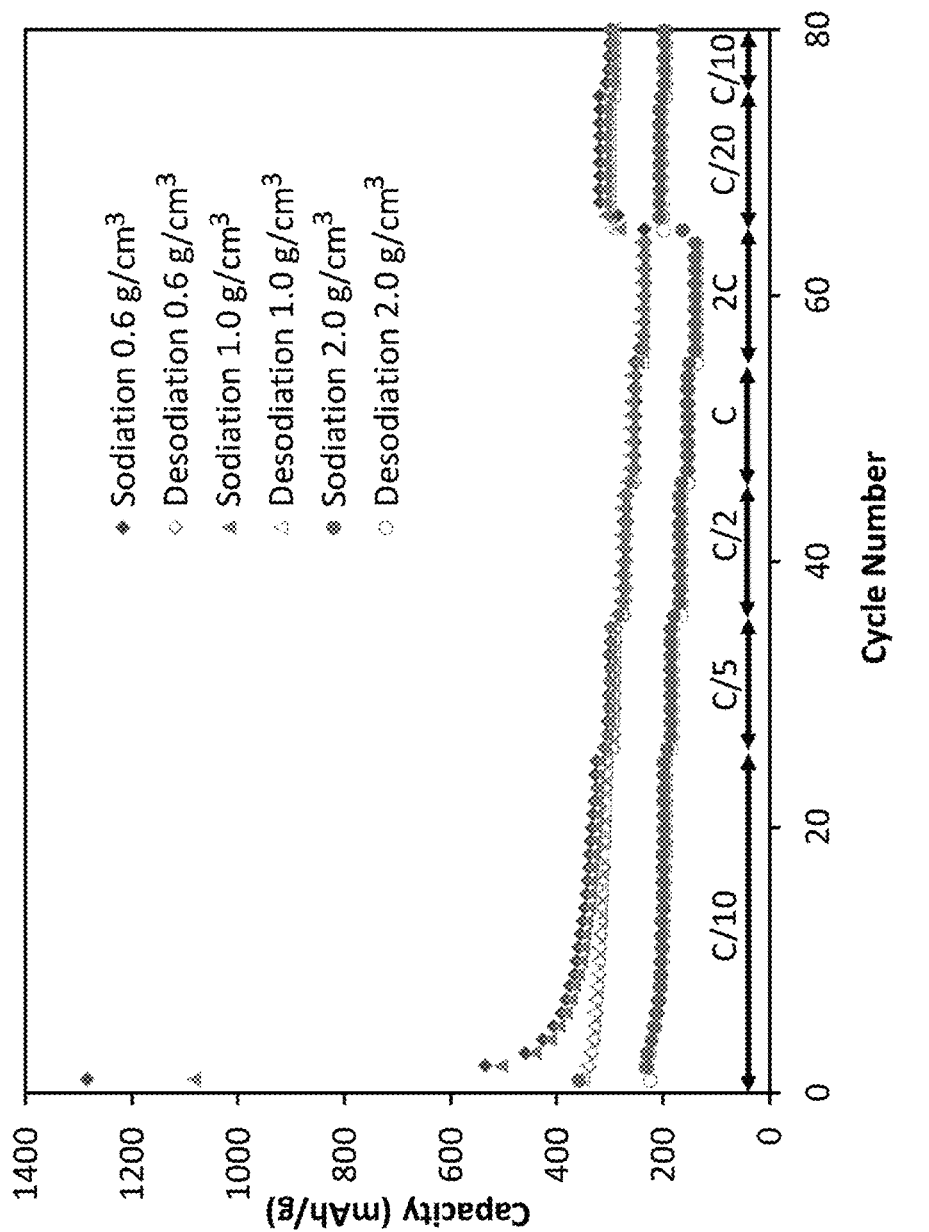
FIG. 7 is a graph of the specific capacity of NPC anodes as a function of the cycle number.

The cyclability of the NPC anodes were examined under long-term cycling. FIG. 7 is a graph of the specific capacity of NPC anodes as a function of the cycle number at a rate of C/10 (cell is charged in 10 hours and discharged in 10 hours). This C-rate is calculated based on the assumption that the final Na:C ratio is 1:6. To understand rate performance, the rate was decreased and then increased for 10 cycles each at C/5, C/2, C, 2 C, and C/20 before returning to C/10. The capacity at a high rate of 2 C is approximately 75% of that at C/10, indicating excellent rate capability and suggesting that the mechanism of charge storage may be related to a fast process such as sodium ion adsorption rather than intercalation. The stacks of small sheets in NPC with lots of edge sites for adsorption may facilitate facile sodium ion adsorption. This suggests that NPC could find applications as a supercapacitor electrode as well. Supercapacitors, also called ultracapacitors, comprise high surface area materials with a high capacitance value and the ability to accept and deliver charge much faster than other capacitors for use in applications requiring many rapid charge/discharge cycles. See P. Simon and Y. Gogotsi, *Acc. Chem. Res.* 46(5), 1094 (2013); G. Wang et al., *Chem. Soc. Rev.* 41, 797 (2012); and Z. Yu et al., *Energy Environ. Sci.* 8, 702 (2015). NPC grown at 0.6 and 1.0 g/cm$^3$ exhibit very similar capacity and rate capability, but NPC at higher density (2.0 g/cm$^3$) exhibits lower capacity. The lower capacity at high density is likely related to the fact that there is less space for sodium storage between the sheets, in pores between stacks of sheets, and at edges and in grain boundaries when the material is less dense. Conversely, the capacity likely increases when the density is reduced to 0.6 or 1.0 g/cm$^3$ due to more space for sodium storage between sheets, in pores, and at edges/grain boundaries. The optimum density is about 1.0 g/cm$^3$ from a storage capacity perspective because it supplies the same capacity at 0.6 g/cm$^3$ NPC but is denser, so it will occupy less volume. As is typical for graphene-like materials, NPC exhibits capacity fade with cycling for the higher density samples. Capacity fade may result from collapse of the sheets to smaller spacing with cycling, from irreversible adsorption of Na ions on some sites, or from impedance associated with SEI formation.

Figure 8:
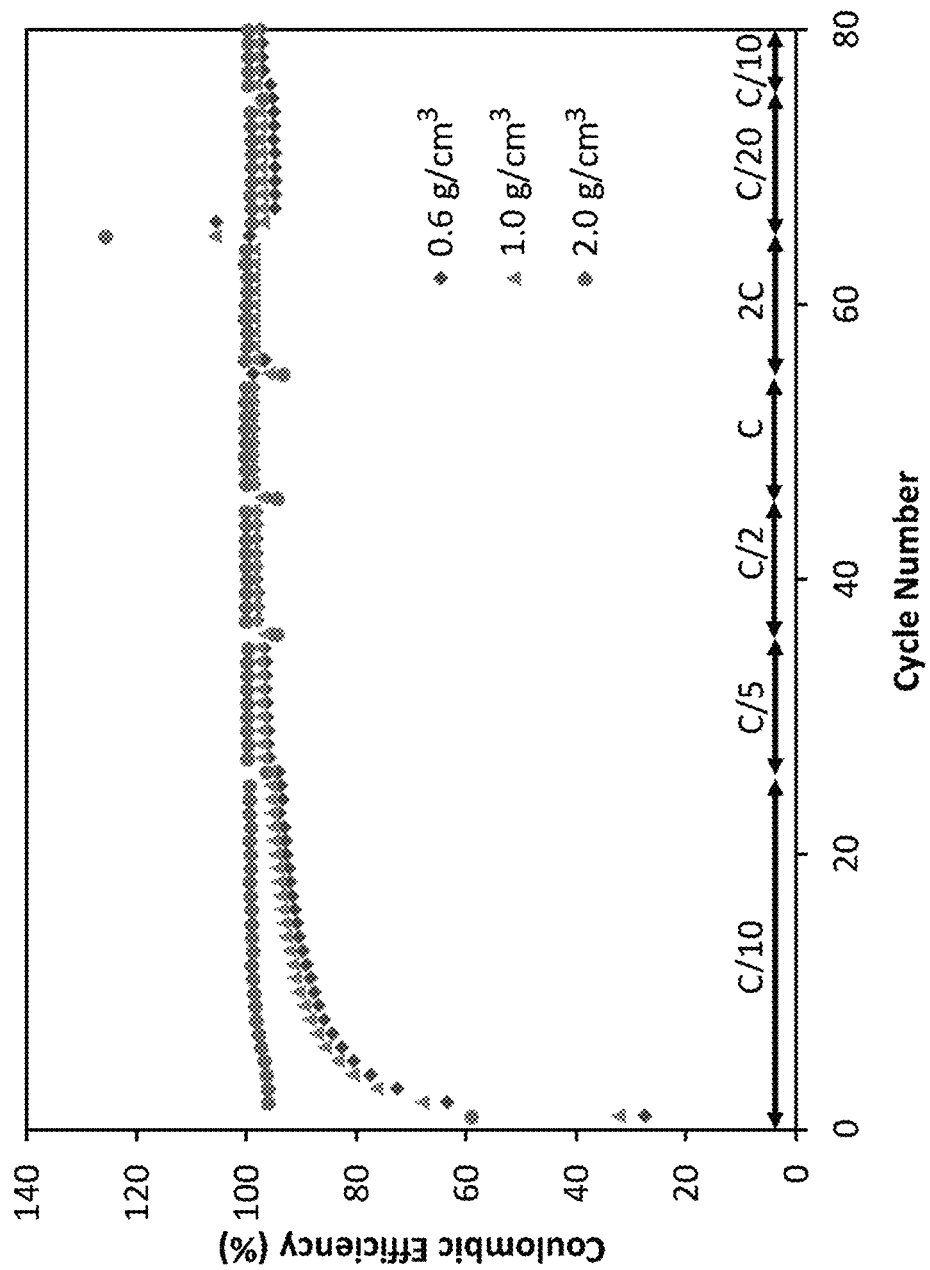
FIG. 8 is a graph of the coulombic efficiency as a function of number of cycles for NPC anodes.

FIGS. 8A and 8B are graphs of the Coulombic efficiency (percentage of charge extracted from the battery to the total charge put into the battery over a full cycle) as a function of number of cycles. The Coulombic efficiency is very similar for the NPC samples with 0.6 g/cm$^3$ and 1.0 g/cm$^3$ densities, reaching ~99% after extended cycling. It is typical for the Coulombic efficiency of graphene to increase with cycling. The low initial Coulombic efficiency suggests (1) SEI forms with each cycle in the early cycles, or (2) that some portion of Na is trapped in the NPC structure with each cycle and cannot be removed below 3.0 V. The Coulombic efficiency increases with increasing density. The Coulombic efficiency is notably higher for the 2.0 g/cm$^3$ density sample, with ~99.5%. The Coulombic efficiency for all densities drops temporarily immediately after increasing the charge rate from C/10 to C/5 to C/2 to C to 2 C, suggesting additional SEI formation or that Na removal (desodiation) is more difficult than insertion (sodiation) at high rates. The latter argument is supported by the increase to higher than 100% Coulombic efficiency when decreasing the rate from 2 C to C/20 around cycle 65. Capacity fade and Coulombic efficiency can be improved by protective coatings on the surface of the NPC such as Al$_2$O$_3$, TiO$_2$, and denser carbon species or by use of solid electrolytes. For examples from the analogous lithium system, see Y. Cao et al., *ChemElectroChem Comm.* 3, 858 (2016); N. J. Dudney, *J. Power Sources* 89(2), 176 (2000); H.-M. Cheng et al., *J. Phys. Chem. C* 116(14), 7629 (2012); and A. Manthiram et al., *Nat. Rev. Mater.* 2, 16103 (2017). Capacity fade and coulombic efficiency can also be improved by co-deposition of nanoparticles. See Z. S. Wu et al., *Nano Energy* 1.1, 107 (2012).

The present invention has been described as a nanoporous carbon as a host material for sodium. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A nanoporous carbon intercalation anode for a sodium-ion battery, comprising a nanoporous carbon deposited on a current collector, wherein the nanoporous carbon comprises a plurality of randomly oriented graphene sheet stacks having an interplanar spacing greater than 3.7 Angstroms such that sodium ions can be inserted into the interplanar spacing of the graphene sheet stacks, and a protective coating on a surface of the nanoporous carbon.

2. The nanoporous carbon intercalation anode of claim 1, wherein the nanoporous carbon has a density of between 0.6 and 2.0 g/cm$^3$.

3. The nanoporous carbon intercalation anode of claim 1, wherein the sodium-ion battery comprises a thin film battery.

4. The nanoporous carbon intercalation anode of claim 1, wherein the protective coating comprises $Al_2O_3$, $TiO_2$, or a dense carbon.

5. The nanoporous carbon intercalation anode of claim 1, further comprising means for applying a positive potential to the nanoporous carbon intercalation anode, whereby sodium ions are inserted into the interplanar spacing of the graphene sheet stacks and stored as sodium ions in the nanoporous carbon.

* * * * *